United States Patent [19]
Friederichs et al.

[11] Patent Number: 5,039,069
[45] Date of Patent: Aug. 13, 1991

[54] ELECTROMAGNETICALLY ACTUATED VALVE DEVICE

[75] Inventors: Otto Friederichs, Garbsen; Wolfgang Lichtenberg, Hanover, both of Fed. Rep. of Germany

[73] Assignee: WABCO Westinghouse Fahrzeugbremsen, Hanover, Fed. Rep. of Germany

[21] Appl. No.: 239,166

[22] Filed: Aug. 31, 1988

[30] Foreign Application Priority Data

Sep. 2, 1987 [DE] Fed. Rep. of Germany ....... 3729222

[51] Int. Cl.$^5$ .................... F16K 31/06; F16K 31/124
[52] U.S. Cl. .............. 251/30.03; 251/30.05; 251/44; 251/129.08; 137/596.16
[58] Field of Search ............... 137/596.16, 487.5; 251/30.02, 30.03, 30.04, 30.05, 36, 38, 45, 46, 129.08, 44

[56] References Cited

U.S. PATENT DOCUMENTS

| | | | |
|---|---|---|---|
| 3,030,981 | 4/1962 | Chatham et al. | 251/30.03 |
| 3,598,148 | 8/1971 | Kroffke | 137/596.16 |
| 3,749,125 | 7/1973 | Peruglia et al. | 137/596.16 |
| 3,917,218 | 11/1975 | Marocco | 251/30 |
| 4,269,225 | 5/1981 | Ruchser et al. | |
| 4,309,021 | 1/1982 | Hafele | 251/36 |
| 4,311,296 | 1/1982 | Scheffel | 251/30.03 |
| 4,413,648 | 11/1983 | Walters et al. | 137/487.5 |
| 4,429,708 | 2/1984 | Strueh | 251/30.03 |
| 4,617,961 | 10/1986 | Lichtenberg | 251/30.03 |
| 4,623,118 | 11/1986 | Kumar | 251/38 |
| 4,662,600 | 5/1987 | Schwelm | 251/30.03 |

FOREIGN PATENT DOCUMENTS

| | | |
|---|---|---|
| 0024877 | 3/1984 | European Pat. Off. |
| 0056450 B1 | 3/1985 | European Pat. Off. |
| 2224180 B2 | 11/1973 | Fed. Rep. of Germany |
| 3108976 A1 | 9/1982 | Fed. Rep. of Germany |
| 3218723 A1 | 10/1983 | Fed. Rep. of Germany |
| 3305093 A1 | 8/1984 | Fed. Rep. of Germany |
| 3306317 A1 | 8/1984 | Fed. Rep. of Germany |
| 8322570.6 | 1/1985 | Fed. Rep. of Germany |
| 3523917 A1 | 1/1986 | Fed. Rep. of Germany |

Primary Examiner—George L. Walton
Attorney, Agent, or Firm—Horst M. Kasper

[57] ABSTRACT

A dual electromagnetically actuated valve device for controlling the connection between a fluid pressure source and a consumer facility, and for controlling the pressure relief function for the consumer facility, and for providing a highly sensitive adjustment of the consumer pressure. The device operates with a high flow rate when the pressure difference between inlet pressure and consumer pressure is great, but prevents an overshoot or undershoot of the consumer pressure. The subject invention makes it possible to provide a sensitive adjustment of the consumer pressure in any normal consumer pressure range.

The invention controls the cross-sectional opening of a pilot control valve to be continuously adjustable by employing a first electromagnetic control valve which is responsive to a declining current dependent stroke characteristic, and a second electromagnetic control valve which is responsive to a rising current dependent stroke characteristic.

19 Claims, 1 Drawing Sheet

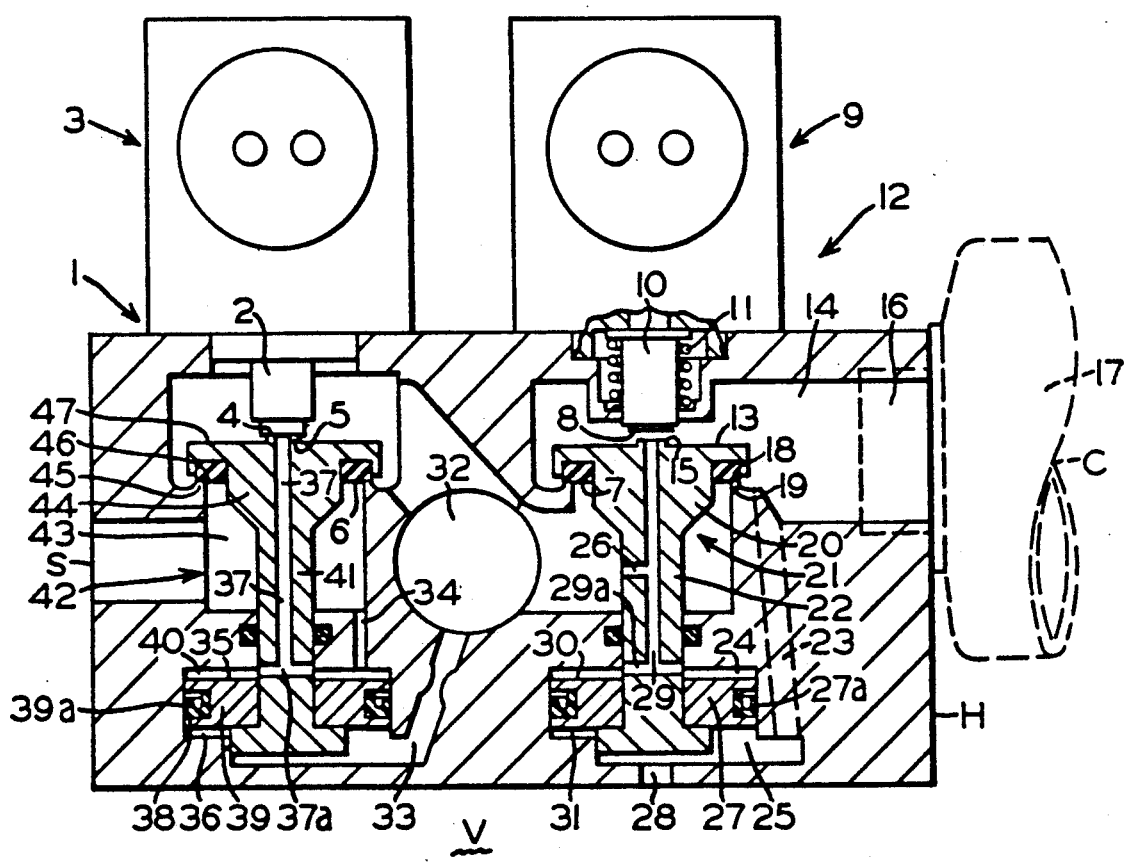

ELECTROMAGNETICALLY ACTUATED VALVE DEVICE

BACKGROUND OF THE INVENTION

The invention relates to an electromagnetically controlled valve device and, more particularly, to an electromagnetically actuated valve device for controlling a connection between a pressure supply source and a consumer facility having a main valve, a fixed valve seat, and a movable valve element is located between an inlet chamber which is connectable to the pressure supply source and an operating chamber which is connectable to a consumer facility, an actuator for controlling the movement of the valve element of the main valve, a pilot control chamber, an inlet pressure acting on a first surface of the actuator corresponding to the inlet chamber for causing the main valve to move toward its open position, the inlet pressure is supplied to the pilot control chamber for acting on a second surface for causing the main valve to move toward its closing direction, the second surface is larger than the first surface, the pilot control chamber is connectable with an operating chamber via a pilot control valve, the pilot control valve includes a moving pilot control valve element and a pilot control valve body which is connected to the armature of an electromagnetic control solenoid, the movable valve element of the main valve and pilot control valve element are coupled together in such a way that a movement of the movable valve element main valve is toward its open direction while the simultaneous movement of the pilot control valve element is toward its closed direction, the electromagnetic control solenoid has a continuous current stroke characteristic, the pilot control chamber is connected to the inlet chamber via a throttle passageway, the throttle passageway is dimensioned in such a way that it allows the flow of fluid pressure at least the same flow rate as that conveyed to the pilot control chamber by the pilot control valve when the cross sectional opening of the pilot valve is small and it allows the flow of fluid pressure fluid at a lower flow rate into the pilot control chamber when the cross sectional opening of the pilot control valve is increased.

BACKGROUND OF THE INVENTION

It will be appreciated that valve devices of this kind are known in the prior art as is shown and disclosed in German Patent No. DE 33 45 697 Al which corresponds to U.S. Pat. No. 4,617,961. As shown, a first electromagnetic valve 22 is disposed on the lower left side of the housing 13 and on the upper right side of the housing 13 is mounted a second electromagnetic valve 2. A diaphragm carrying on one of its sides the main valve element 29 and 36 is encircled by the respective first surface and serves as an actuator. The pilot control chamber is limited by the other side of the diaphragm which forms the second surface of the actuator. The second surface is larger than the first surface. The diaphragm also carries a pilot valve element 26 and 9, which cooperates with a pilot valve body connected to the armature of the electromagnetic control solenoid to form a pilot valve which connects the pilot control chamber of the valve device to the operating chamber. The pilot control chamber of the valve device shown on the right side along with the outlet chamber 11 are connected to the outlet. Due to the fact that they both are secured to the diaphragm, the respective main valve elements and the pilot valve elements are rigidly connected together in such a way that movement of the main valve element of the main valve is accompanied by the movement of the pilot valve element in closing direction of the pilot valve. The electromagnetic control solenoid of the valve device includes an actuating member namely, an armature which is moved to either end position during energization and deenergization of the solenoid. The corresponding pilot valve and the corresponding main valve assume a position which is completely open or completely closed.

It will be appreciated that valve devices of this type are only unsuitable for a sensitive adjustment of the consumer pressure, since they result in a high flow rate through the opened main valve when the pressure differences between inlet pressure and consumer pressure are high while the control electromagnet is in actuated position and this leads to overshoot or undershoot of the consumer pressure.

The possibility of adjusting the flow area of a valve 10, 18 by a moving valve element 18 with great sensitivity, by means of an electromagnetic control solenoid with continuous current stroke characteristic, is shown and disclosed in European Patent No. EP-B-0 024 877. This is difficult to achieve by a sliding type of valve element which is disposed within the core of the electromagnetic control solenoid, since the size is dependent upon the strength of the energizing current. However, the magnet dimensions and cost rise dramatically with the size of valve cross-sectional area. Since the energizing current consumption is proportionally increased with the magnet dimensions, this solution is only practical for valves having a small flow rate.

The possibility of controlling the cross-sectional area of a main valve with great sensitivity, by means of a pilot valve with sensitively adjustable cross section, is shown and disclosed in German Patent No. DE 33 06 317 Al. For this purpose, the pilot valve is equipped with a pilot valve element 34 which is connected to the armature of an electromagnet which generates a force in proportion to the energizing current. The main valve is equipped with a moving main valve element attached to an actuator 14. Pressure from a pilot control chamber 24 and a spring 42 is applied to the actuator on a second surface in closing direction of the main valve. In opening direction of the main valve, the actuator is pressurized on a first surface by means of inlet pressure and on a third surface by means of consumer pressure. The pilot control chamber corresponding to the second surface is connected to an inlet chamber 16 corresponding to the first surface via a throttle passageway 20, 22. On the other side, the pilot control chamber can be connected to an operating chamber 18 corresponding to the third surface of the actuator. When the pilot valve is opened by energizing the electromagnet, an excess amount of force is exerted on the actuator for a given cross-sectional opening. Thus, the main valve is forced toward its opening direction due to a pressure-drop in the pilot control chamber. This excess force compresses the spring which is transmitted to the pilot valve element and the armature of the electromagnet, and pushes both backward in closing direction of the pilot valve. Until an equilibrium is reached between the magnetic force and the excess force, the pilot control valve and main valve here are effected by force. With a given energizing current, the cross-sectional openings of the pilot valve and main valve are dependent upon the excess force and the pressure difference. If the consumer facility is closed, such as, a brake system in its actuated state, if it can be filled up to inlet pressure by corresponding actuation, the excess force in this valve device under a given energizing current with a certain consumer pressure can become so great that first the pilot valve, and subsequently, due to the renewed increase of the pressure in the pilot control chamber, the main valve is closed. This valve device, therefore, as the valve devices mentioned above, is unsuitable for the sensitive adjustment of the consumer pressure.

OBJECTS AND SUMMARY OF THE INVENTION

Therefore, it is an object of this invention to provide an improved valve device of the kind mentioned above by designing a simple means in such a way that a sensitive adjustment of the consumer pressure becomes possible for any consumer pressure and inlet pressure range.

A pressure fluid supply facility, a pressure medium supply, and a pressure control device are located between the consumer facility, the supply source, and the valve device according to the invention.

The present invention makes it possible to adjust with a high degree of sensitivity the fluid flow rate conveyed to a consumer facility. Thus, the consumer facility with continuous pressure fluid consumption, depending on each individual operation. The invention is suitable for application with pressure of any type of fluid.

The invention can be achieved with pilot valves, main valves, and actuators of any suitable construction, and with any configuration of the surface areas. The slide valves, the seat valves, and combined constructions may be mentioned as examples for the valves. The actuator can be constructed, for example, with a sliding seal and/or with a diaphragm seal, or with a step piston.

In one embodiment, the pressure in the outlet chamber is essentially at atmospheric pressure. In this case, the outlet is directly connected to the atmosphere and serves as a pressure relief means. If, however, the pressure in the outlet chamber lies considerably above atmospheric pressure, at least temporarily during pressure peaks, it may also be advisable for the purpose of optimizing the functional operation to construct a different embodiment. There have been examples of applications with a higher pressure in the outlet chamber when the pressure fluid cannot be exhausted to atmospheric by the pressure relief means, as is customary in particular in systems with pressures fluids other than air, or when components causing impact pressure are located between the outlet and the pressure relief means, such as, in those employing long tubing or sound-proofing devices.

The term "continuous stroke current characteristic" refers to the fact that, at least within the working stroke of the armature of the electromagnetic control solenoid without taking into account the response phase, phenomena of hysteresis, and similar influences to each value of the energizing current which corresponds to a certain stroke of the armature of the electromagnetic control solenoid. This dependency is not defined and it may be linear, progressive stages, digressive stages, or a mixture of all. If the armature is moved outwardly while the electromagnet is not energized, and if the armature is drawn inwardly due to the energization of the electromagnetic control solenoid, the stroke current characteristic is receding. If the armature is drawn inwardly while the electromagnetic control solenoid is deenergized and if it is pushed outwardly due to the energization of the electromagnet, the stroke current characteristic rises. With regard to design, these characteristics are achieved, for example, by a suitably biased armature with the aid of a suitable spring. Depending on the particular stroke current characteristic, the electromagnetic control solenoid may be either a constant current electromagnet or an operating current electromagnet.

In the case of a valve device, the passageways between the operating chamber or outlet chamber and equalizing chamber can be constructed as a throttle means. Therefore, the actuator is only slowly equalized with regard to the pressure forces during a fast pressure build-up phase, with the result that the actuator itself, and thus also the main valve, acquire a tendency to close which, in turn, stabilizes the function of the respective valve device. In accordance with the present invention, there is provided an electromagnetic control valve device for controlling the pressure relief function for a consumer facility comprising, a main valve having a fixed valve seat and a moving main valve element which is located between an operating chamber connected to the consumer facility and an outlet chamber connected to an outlet and in which the outlet is indirectly connected to a pressure relief space, an actuator controlling the movement of the main valve, a pilot control chamber, the actuator having a first surface facing the operating chamber so that pressure in the operating chamber tends to move the main valve toward its opening direction, the actuator having a second surface facing the pilot control chamber so that pressure in the pilot control chamber tends to move the main valve toward its closing direction, the second surface is larger than the first surface, the pilot control chamber can be connected to the outlet chamber via a pilot control valve, the pilot control valve includes a valve seat and a movable valve member connected to an armature of the electromagnetic control solenoid, the main valve element and the movable member are interconnected in such a way that a movement of the main valve element in opening direction of the main valve causes simultaneous movement of the movable member in closing direction of the pilot control valve, the electromagnetic control solenoid has a continuous current stroke characteristic, the pilot control chamber is connected to the operating chamber via a throttle passageway, the throttle passageway is dimensioned in such a way that when the cross-sectional opening of the pilot control valve is small it permits a flow rate to the pilot control chamber at the same flow rate that occurs from the pilot control chamber, and when the cross-sectional opening of the pilot control valve is increased it permits a lower flow rate into the pilot control chamber.

A device of combined valves represents an economical structure of providing both a pressure build-up function of the inlet valve device and a pressure-reduction function of the outlet valve device for a consumer facility, and additionally offers the advantage of a space-saving and construction-cost-saving construction.

DESCRIPTION OF THE DRAWINGS

The above objects and other attendant features and advantages will be more readily appreciated as the present invention becomes better understood by reference to the following detailed description when considered in conjunction with the accompanying drawings, wherein:

The single FIGURE is a partial vertical view of an electromagnetic control valve device for controlling pressure between a source and a consumer in accordance with the present invention.

DETAILED DESCRIPTION OF THE INVENTION

Referring now to the drawing, and in particular to the single FIGURE, there is shown a valve device generally characterized by the letter V which includes a suitable housing H. As shown, a first electromagnetically actuated valve device is located on the left side, as viewed in the drawing, for controlling the communication between a pressure supply source S and a consumer facility C. An electromagnetically actuated valve device 12 is located on the right side, as viewed in the drawing, for controlling the pressure relief function for the consumer facility C.

The valve device includes a main valve 45, 46 located between an inlet chamber 43 which is connected to the pressure supply source, and an operating chamber 32 which is connected to the consumer facility. The main valve has a movable valve element 46 and a valve seat 45 formed on the house V. An actuator, generally characterized by numeral 42, is provided for controlling the movement of the movable valve element 46.

In addition to the inlet chamber 43 and the operating chamber 32, the valve housing V contains a pilot control chamber 40 and an equalizing chamber 36. The pilot control chamber 40 is connected to the inlet chamber 43 via a throttle passageway 34. The throttle passageway 34 is dimensioned in such a way that it functions in conjunction with a pilot valve 4, 5 in the manner as described hereinafter. The equalizing chamber 36 is connected to the operating chamber 32 via a passageway 33. The passageway 33 is constructed and is similar to the throttle passageway 34.

The actuator 42 has a first surface 6, a second surface 35, a third surface 47, and a fourth surface 38. As shown, the inlet pressure is applied to the first surface 6 of the actuator 42 by the inlet chamber 43, so that the main valve 45, 46 is urged toward its open direction.

It will be seen that the pressure in the pilot control chamber 40 is applied to the second surface 35 of the actuator 42. Thus, the pressure in the pilot control chamber 40 urges the main valve 45, 46 in its closed direction. The pressure of for the consumer is applied to the third surface 47 of the actuator 42 which corresponds to the operating chamber 32. The pressure in the equalizing chamber 36 is applied and urges the main valve 45, 46 in the open direction. Thus, the pressure on the fourth surface 38 of the actuator 42 corresponds to the pressure in the equalizing chamber 36. In a fast pressure build-up phase, this pressure is not equal to the consumer pressure in the operating chamber 32 due to the fact that the passageway 33 is constructed as a throttle passageway. However, the passageway 33 is not constructed as a throttle passageway, so that this pressure always is equal to the consumer pressure. Further, as seen, the second surface 35 is larger than the first surface 6.

The valve device 1 is equipped with an electromagnetic control solenoid 3. The electromagnet 3 includes an armature 2 for controlling a pilot valve 4, 5. The pilot valve 4, 5 is oriented in line with the main valve 45, 46 with regard to the flow direction from inlet chamber 43 to the operating chamber 32 via the pilot control chamber 40 which is connectable with the operating chamber 32. The electromagnetic control solenoid 3 is provided with a declining current stroke characteristic for pushing the armature 2. The pilot valve 4, 5 consists of a pilot valve element 4 which is operated by the armature 2 of the electromagnetic control solenoid 3. The main valve element and the pilot valve element are rigidly coupled in such a way that any movement of the main valve element in opening direction of the main valve 45, 46, as viewed in the drawing, is accompanied by simultaneous movement of the pilot valve element in closing direction of the pilot valve 4, 5. The actuator 42 is constructed as a piston which consists of two parts 44 and 39 placed in series and rigidly connected to one another by means of a shaft 41. The first valve surface 6 is part of the piston 44 while the second reaction surface 35 is part of the other piston 39. Thus, the first surface 6 and the second surface 35 are in opposed facing relationship. The first surface 6 is cooperatively associated with a valve seat 46 which is proportionally sized and simultaneously serves as the main valve. The upper third surface 47 is part of the one piston part 44. Since this third surface 47 is in communication with the consumer pressure, the pressure force tends to close the main valve 45, 46, which is an objectional operation, as will be described hereinafter. In order to avoid this adverse effect, the fourth surface 38 is situated on the underside of two other piston part 39. This fourth surface 38 is slightly larger than the third surface 47 for reasons which will be described hereinafter. The third surface 47 includes the valve seat 5 which forms the pilot valve element. Thus, not only the pilot valve element but also the main valve element are part of the one piston element 44. The location of the force reaction surfaces 6, 35, 47 and 38 to each of the chambers is based on the fact that the respective surface limits the respective chamber. A passageway 37 extends through the body portion of the piston 44 and terminates into the valve seat 5. This passageway is connected to the pilot control chamber 40 via transverse passageway 37a. When the pilot valve 4, 5 is opened, it connects the pilot control chamber 40 with the operating chamber 32. The lower piston part 39 is located and sealed within the housing in such a way that it can be axially displaced and separates the pilot control chamber 40 from the equalizing chamber 36 by means of a seal 39a. The throttle passageway 34 is located between pilot control chamber 40 and inlet chamber 43, and is constructed to restrict the flow by a predetermined amount.

The electromagnetic control solenoid 3 is constructed with a reduced stroke current characteristic. This characteristic is produced on the armature 2 with the aid of an external biasing spring which normally cause the outward movement of the armature 2. The electromagnetic control solenoid 3 is disposed above the actuator member 42 so that the armature 2 moves downwardly and presses against the valve seat 46. Thus, it acts as the pilot valve element and against the valve seat 46, and causes the main valve element to seat against the valve seat 45. Further, the third surface 47 is exposed to the pressure of the consumer chamber so that the valve seat 45 tends to close, and thus closes the pilot valve 4, 5. The force exerted on the actuator 42 by the armature 2 during this operation is just sufficient to securely close the pilot valve 4, 5. For the following functional operation, it is assumed that the electromagnetic control solenoid 3 is energized by a suitable source of variable energizing current (not shown) and that the consumer pressure is monitored by means of a suitable pressure sensor (not shown). The pressure responsive signals are evaluated by an actuation device of switching the current ON and OFF and/or for adjusting the amount of the energizing current. This manner of connecting the electromagnetic control solenoid 3 is electrically controlled and/or electrically regulated type of brake systems for motor vehicles. It will be appreciated that as long as the actuation device does not supply an energizing current sufficient to exceed its response current, the armature 2 of the electromagnetic control solenoid 3 remains inactive so that the pilot valve 4, 5 and the main valve 45, 46 remain closed. The activating response current is the selected amount of energizing current which causes the armature 2 to be raised from its downward position against the force of the internal biasing spring. The inlet pressure from the inlet chamber 43 is now conveyed to the pilot control chamber 40. During this time and as long as the inlet pressure is higher than the consumer pressure, the actuator 42 has an excess amount of pressure force for closing the main valve 45, 46. Due to the configuration and the size of the surfaces 6, 35, 47 and 38, the excess force, aside from the pressure force of the internal spring which biases the armature 2 in a downward direction, represents the closing force. Thus, the closing force of the pilot valve 4, 5 is dependent on this spring. The following description refers exclusively to the operation of the valve device, which is responsive to the functioning electromagnetic control solenoid 3. When the electromagnetic control solenoid 3 is energized, the armature is retracted to a stroke length which is proportional to the force of the energizing current. The electromagnetic control solenoid 3 is used as an operating current sensitive magnet. The retraction stroke opens the pilot valve 4, 5 by a corresponding or appropriate cross- sectional area. This causes air pressure to flow from the pilot control chamber 40 through the passageway 37 and the pilot valve 4, 5 into the operating chamber 32 and, in turn, into the consumer facility. If the energizing current is small and the cross-sectional opening is also small, the same amount of pressure fluid is fed through the throttle passageway 34 into the pilot control chamber 40 and is discharged through the pilot valve 4, 5 into the consumer facility. During this time, the pressure in the pilot control chamber is maintained and the main valve 45, 46 remains closed so that the consumer facility is subjected to only a small addition of air pressure with a correspondingly slow rise in consumer pressure.

If the energizing current is raised, the retraction stroke of the magnet 2 as the cross-sectional area of the opening of the pilot valve 4, 5 is increased to such a degree that a greater amount of pressure fluid is conveyed from the pilot control chamber 40 through the pilot valve 4, 5 than can flow through the throttle passageway 34. This leads to a pressure drop in the pilot control chamber 40 and increases the force in opening direction of the main valve 45, 46 by the actuator 42, which by moving and lifting the actuator 42 and thus the main valve member from the valve seat 45 opens the main valve 45, 46. This opening movement of the actuator 42, as well as the main valve, causes the valve seat 5 to seat against the pilot valve member so that the pilot valve 4, 5 will close. The opening movement of the actuator 42 and of the main valve and simultaneously the closing movement of the pilot valve come to a halt when the cross-sectional opening of the pilot valve 4, 5 is reduced to a value in which the discharge of pressure from the pilot control chamber 40 into the consumer facility is equalized. Thus, a pressure can be maintained in the pilot control chamber 40 which establishes an equilibrium of forces on the actuator 42. During this time, the actuator 42 assumes a floating position in which the pilot control valve 4, 5 as well as the main valve 45, 46 are open and the consumer facility is supplied with pressure fluid, even through the greater cross-sectional opening of the main valve 45, 46, so that a correspondingly greater flow rate and with faster rise in consumer pressure occurs. The exact location of the floating position of the actuator 42 and the amount of the cross sectional opening of the main valve 45, 46 are determined by the given retraction stroke of the electromagnet 2, which is controlled by the energizing current. Thus, the operating range of the electromagnetic control solenoid 3 is predetermined not only by the outermost extended position but also by a stop for the armature 2 innermost retracted position. Therefore, the cross-sectional opening of the main valve 45, 46, and in turn, the flow rate of the fluid pressure into the consumer facility, and the rate at which the consumer pressure rises, are readily controlled by means of the energizing current.

The rise in consumer pressure is accompanied by a rise in the pressure pilot control chamber 40. This, along with the application of consumer pressure to the third surface 47, result in an increase of the force affecting the actuator 42 to move in closing direction of the main valve 45, 46. This increase in force is compensated by the fact that the rise in consumer pressure continues into the equalizing chamber 36, and leads to an increase in force on the fourth surface 38. Therefore, the actuator 42 essentially maintains an equilibrium of forces when the main valve 45, 46 is opened, so that the main valve cross-sectional opening and the pilot valve cross-sectional opening, which have been established by the power level of the energizing current, are maintained fixed if the energizing current remains constant.

On the other hand, even when the opening cross-sectional opening of the valves 4, 5 and 45, 46 are constant, the rise in consumer pressure leads to a flattening-out effect of the pressure fluid flow rate, which limits the rate of rise in the consumer pressure.

The valve device 1 is adapted to provide sensitive adjustment of the consumer pressure over the entire pressure range, which is one of the objects of the invention. Thus, it is possible to control opening of the pilot valve 4, 5 by varying the energizing current. This adjustability of the energizing current varies the cross-sectional opening of the main valve 40, 41 and the flattening-out effect on the rate of rise in consumer pressure with rising consumer pressure. In addition, the valve device 1 makes it possible to divide the rise in consumer pressure into several phases with differing main valve cross-sectional openings, and controls the rates of rise in consumer pressure. In this manner, a first phase could consist of the achievement of a faster rise in consumer pressure by exciting the electromagnetic control solenoid with a high energizing current. If the pressure sensor signals the appearance of a predetermined consumer pressure, the actuation device could in either one or more phases reduce the energizing current to values at which the desired consumer pressure drops into the range of flattening out of the rate of pressure rise.

If then the pressure sensor signals the appearance of the desired consumer pressure, an additional rise in consumer pressure is prevented by the actuation device by means of switching OFF the energizing current and thus closing the pilot valve 4, 5 and the main valve 45, 46 without any significant overshoot. If, subsequently, the consumer pressure should fall below the desired value, the desired consumer pressure can be restored by opening the pilot valve 4, 5 and, depending on the rate of decrease of consumer pressure, the main valve 45, 46 as well, in response to a corresponding signal produced by the pressure sensor. Therefore, the valve device 1 is also suitable for the sensitive supplying of a consumer pressure over the entire pressure range.

As previously mentioned, the fourth surface area 38 of the actuator 4 is slightly larger than the third surface area 47. Therefore, a resultant force from the consumer pressure on the actuator 42 operates toward opening direction of the main valve 45, 46 and diminishes the pressure decrease in the pilot control chamber 40, which is necessary for opening the main valve 45, 46, and thus results in a quicker response of the main valve 45, 46. However, this desirable effect, particularly with higher energizing currents, can be disadvantageous since it may lead to a rupture in the main valve 45, 46 and/or unstable movement or oscillation of the actuator 42. In applications in which this disadvantage is not tolerable, the construction of the passageway 33 as a throttle offers a solution. Such a construction does allow the generation of the resultant force mentioned when at rest, but it eliminates this force partially or completely during the operating phase of the valve device 1 by delaying the transmission of the consumer pressure from the operating chamber 32 to the equalizing chamber 36.

It will be appreciated that the valve device can be utilized for the normal application without the special construction of the passageway 33 as a throttle connection in a manner not shown in detail. Additionally, the dimensional relationships of the relative reactive surfaces of the actuator can vary to influence the response behavior of the main valve 45, 46.

As shown, a second electromagnetic valve device 12 is located on the right-hand side of the drawing. A main valve 19, 18 is located between the operating chamber 32 and an outlet chamber 14 which is also formed at the right end of the housing. The outlet chamber 14 is connected to an outlet 16 which, in turn, is connected to a pressure relief space.

In its function and construction, the valve device 12 is substantially identical and similar to the valve device 1. The valve 12 includes an actuator 21 along with a first surface 7, a second surface 30, a third surface 13, and fourth surface 31. A first movable piston portion 20, a piston body 22 having a central passageway 29, a main valve seat 18, and a pilot valve seat 15 have corresponding positions the same as those of elements 42, 6, 35, 47, 38, 44, 39, 41, 37, 46, and 5 of the valve device 1. The valve 1 includes a valve seat 19, a pilot control chamber 24, an equalizing chamber 25, an armature 10 of the electromagnetic control solenoid 9, a pilot control valve body 8, and a pilot control valve 8, 15 which correspond to the positions of the same elements 45, 40, 36, 2, 4, and 4, 5 of the valve device 1.

The valve device 12 differs from the valve device 1 in the following manner. The pilot control chamber 24 is connected to the operating chamber 32 while the throttle passageway 26 is formed as penetration is essentially oriented through the central area of the piston body 22 and which provides a communication path to the operating chamber 32. The first surface 7 is in communication with the operating chamber 32 and thus receives the desired consumer pressure. The third surface 13 communicates with the outlet chamber 14 and thus receives pressure from the chamber 14. The third surface 13, the equalizing chamber 25, and the fourth surface 31, corresponding to the equalizing chamber 25, as will be explained hereinafter, represent a refinement stage of the basic embodiment of the valve device 12, in which the equalizing chamber 25 is sealed against a pressure relief space which is connected to the outlet chamber 14 via a passageway 23 shown by dotted lines. In this refinement stage, the pressure of the equalizing chamber 25, which is applied to the fourth surface 31, is received from the outlet chamber 14. In the basic embodiment, the equalizing chamber 25 is connected to the pressure relief space which is represented by an outlet port 28.

The electromagnetic control solenoid 9 is installed in relation to the actuator in the same manner as the electromagnetic control solenoid 3 of the valve device 1, but it is designed to have rising stroke current characteristic for pulling an armature 10. The latter is effected, for example, by biasing the armature 10 toward its inward direction by means of an external spring 11. When the electromagnetic control solenoid 9 is deenergized, the armature 10 is completely moved inwardly. This causes the pilot control valve 8, 15 to be opened so that no residual pressure can build up or remain in the consumer facility while this state prevails. This is important, for example, in the case of a motor vehicle brake system when it is in its released condition.

If consumer pressure is desired to be built up in the consumer facility as well as in the operating chamber 32, the electromagnetic control solenoid 9 is energized with maximum energizing current. As a result, the armature 10 is completely moved outwardly and the pilot control valve 8, 15 and the main valve 19, 18 are closed. The force exerted on the actuator 21 by the armature 10 is just sufficient enough to securely close the pilot control valve 8, 15. The valve device 12 of the electromagnetic control solenoid 9 then acts as a continuous current magnet during this state at rest.

When the electromagnetic control solenoid is deenergized, the closing force of the pilot control valve 8, 15 corresponds to the armature stroke 10 toward inward direction of the armature 10, thus causing an opening stroke of the pilot control valve 8, 15 to occur. This behavior can be used to achieve a sensitive pressure relief function for the consumer facility. During this time and during the state of rest, the valve device 12 functions in the same manner as the valve device 1. Thus, it can be applied in the same manner as the valve device and, therefore, is also suitable for sensitive replenishment of increased consumer pressure over the entire pressure range.

If the outlet chamber 14 does not contain any noticeable overpressure, the same is applicable for the basic embodiment of the valve device 12, in which the third surface 13, the equalizing chamber 25, and the fourth surface 31 are considered to be ineffective. However, if a noticeable overpressure does exist or build-up of pressure occurs in the outlet chamber 14, this pressure biases the actuator 21 in the basic embodiment mentioned via the third surface 13 in closing direction of the main valve 19, 18. If said overpressure occurs as continuous pressure, the main valve 19, 18 will be opened with a delay, i.e., the response behavior of the valve device 12 will be impaired. If the overpressure occurs temporarily, for example, as transient pressure, it may result in one or several unwanted movements of the actuator 21 and thus may cause unstable closure or chattering of the main valve 19, 18. One application in which a phenomenon may occur is relieved by use of a sound absorber 17 connected to the outlet port 16. In these cases, the actuator 21 can be largely or completely equalized in relation to the pressure of the outlet chamber 14 or made non-sensitive to it by adding the equalizing chamber 25, the fourth surface 31, and the passageway 23 to the basic valve. In particular, when an overpressure condition exists, as when there is continuous pressure in the outlet chamber 14, the passageway 23 can be constructed as a throttle device. In such a case, the pressure applied to the fourth surface 31 is used to quickly open the main valve 19, 18 so that the unstable movements of the actuator 21 are damped or eliminated.

It will be readily recognized that the actuation device along with the valve device 1, when used as well as the control of the valve device 12, form the combined valve device shown in the drawing. Thus, such an arrangement is perfectly suitable for controlling the consumer pressure.

Furthermore, it will be recognized that the differing statements referring to one valve device can be applied to the other valve device for certain applications.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. An electromagnetically actuated valve device for controlling a connection between a pressure supply source and a consumer facility comprising:
   (a) a main valve having a fixed valve seat and a movable valve element is located between an inlet chamber which is connectable to the pressure supply source and an operating chamber which is connectable to a consumer facility;
   (b) an actuator for controlling the movement of the valve element of the main valve;
   (c) a pilot control chamber;
   (d) an inlet pressure acting on a first surface of the actuator in opening direction of said main valve, said first surface facing the inlet chamber said actuator having a second surface facing said pilot control chamber, said second surface being acted upon in closing direction of said main valve by the pressure in said pilot control chamber;
   (f) the second surface is larger than the first surface;
   (g) the pilot control chamber is connectable with said operating chamber via a pilot control valve;
   (h) the pilot control valve includes a moving pilot control valve element and a pilot control valve body which is connected to the armature of an electromagnetic control solenoid;
   (i) the movable valve element of the main valve and pilot control valve element are coupled together in such a way that a movement of the movable valve element of the main valve in opening direction of the main valve is a simultaneous movement of the pilot control valve element in closing direction of said pilot control valve;
   a controlled valve whereby
   (j) a controlled valve whereby the electromagnetic control solenoid has a continuous current versus stroke characteristic;
   (k) the pilot control chamber is connected to the inlet chamber via a throttle passageway; and
   (l) the throttle passageway is dimensioned in such a way that it allows the flow of pressure fluid into the pilot control chamber at least the same flow as that conveyed from the pilot control chamber by the pilot control valve when the cross sectional opening of the pilot valve is small and that it allows the flow of pressure fluid at a lower flow rate into the pilot control chamber than that conveyed through the pilot control valve from the pilot control chamber when the cross-sectional opening of the pilot control valve is increased;
   wherein consumer pressure is applied to the actuator on a third surface facing the operating chamber, wherein:
   (1) the third surface is formed on the actuator in such a way that the pressure acting upon it biases the actuator in the closing direction of the main valve; and
   (2) an equalizing chamber is connected to the operating chamber, said equalizing chamber being limited by a fourth surface of the actuator on which pressure from the equalizing chamber is applied to the actuator in the opening direction of the main valve.

2. The electromagnetically actuated valve device, according to claim 1, wherein the connection between the operating chamber and the equalizing chamber is constructed as a throttle passageway.

3. The electromagnetically actuated valve device, according to claim 1, wherein:
   (a) the actuator is constructed as a piston consisting of two piston portions placed in series and connected by means of a body portion; and
   (b) the first surface is located on the one piston portion, the second surface is located on the other piston portion, and a first surface and a second surface facing one another.

4. The electromagnetically actuated valve device, according to claim 3, wherein the third surface is located on the one piston portion, and the fourth surface is located on the other piston portion.

5. The electromagnetically actuated valve device, according to claim 4, wherein a valve seat is surrounded by the third surface, said valve seat serving as said pilot control valve element.

6. The electromagnetically actuated valve device, according to claim 3, wherein:
   (a) the one piston portion has a valve seat including the first surface which serves as a main valve element, and which simultaneously functions as a pilot control valve element; and
   (b) the body portion and the one piston portion are connected by a passageway to the pilot control chamber, and which forms the pilot control valve seat.

7. The electromagnetically actuated valve device, according to claim 1, wherein a first throttle passageway is connected between the inlet chamber and the pilot control chamber, and a second throttle passageway is connected between the operating chamber and the pilot control chamber.

8. The electromagnetically actuated valve device, according to claim 7, wherein a third throttle passageway is connected between the inlet chamber and the pilot control chamber, and a fourth throttle passageway is connected between the operating chamber and pilot control chamber.

9. The electromagnetically actuated valve device, according to claim 1,
wherein the controlled valve is a proportionally controlled valve.

10. The electromagnetically actuated valve device, according to claim 1,
wherein the controlled valve employs a stroke proportional to the current.

11. An electromagnetically actuated valve device, comprising the first electromagnetically actuated valve device according to claim 1 and further comprising a second electromagnetically actuated valve device including
 (a) a second main valve having a second fixed valve seat and a moving second main valve element which is located between a second operating chamber connected to a consumer facility and an outlet chamber connected to an outlet and in which the outlet is at least indirectly connected to a pressure relief space;
 (b) a second actuator controlling the movement of the second main valve element;
 (c) a second pilot control chamber;
 (d) the second actuator having a fifth surface facing the second operating chamber, so that pressure in the second operating chamber tends to open the second main valve;
 (e) the second actuator having a sixth surface facing the second pilot control chamber so that pressure in the second pilot control chamber tends to close the second main valve;
 (f) the sixth surface is larger than the fifth surface;
 (g) the second pilot control chamber can be connected to the outlet chamber via a second pilot control valve;
 (h) the second pilot control valve includes a moving second pilot control valve element and a second pilot control valve body which is connected to a second armature of a second electromagnetic control solenoid;
a second controlled valve wherein
 (i) the second main valve element and the second moving pilot control valve element are interconnected in such a way that a movement of the second main valve element in opening direction of the second main valve is a simultaneous movement of the second moving pilot control valve element in closing direction of the second pilot control valve;
 (j) the second electromagnetic control solenoid has a continuous current versus stroke characteristic;
 (k) the second pilot control chamber is connected to the second operating chamber via a second throttle passageway; and
 (i) the second throttle passageway is dimensioned in such a way that when the cross-sectional opening of the second pilot control valve is small it permits a flow rate to the second pilot control chamber at at least the same flow rate that occurs from the second pilot control chamber through the second pilot control valve, and when cross-sectional opening of the second pilot control valve is increased it permits a lower flow rate into the second pilot control chamber than that occurring from the second pilot control chamber through the second pilot control valve;
wherein pressure in the outlet chamber is applied to the second actuator on a seventh surface facing the outlet chamber, wherein:
 (1) the seventh surface is attached to the second actuator in such a way that the pressure acting upon it biases the second actuator toward the closing direction of the second main valve;
 (2) a second equalizing chamber is connected to the outlet chamber; and
 (3) an eighth surface on the second actuator facing the equalizing chamber on which pressure from the equalizing chamber is applied to bias the second actuator in opening direction of the second main valve wherein the first electromagnetic valve device and the second electromagnetic valve device are combined in a single housing, the operating chambers of said electromagnetically actuated valve devices being one of connected to and identical with each other.

12. An electromagnetic control valve device for controlling the pressure relief function for a consumer facility comprising:
 (a) a main valve having a fixed valve seat and a moving main valve element which is located between an operating chamber connected to a consumer facility and an outlet chamber connected to an outlet and in which the outlet is at least indirectly connected to a pressure relief space;
 (b) an actuator controlling the movement of the main valve element;
 (c) a pilot control chamber;
 (d) the actuator having a first surface facing the operating chamber, so that pressure in the operating chamber tends to open the main valve;
 (e) the actuator having a second surface facing the pilot control chamber so that pressure in the pilot control chamber tends to close the main valve;
 (f) the second surface is larger than the first surface;
 (g) the pilot control chamber can be connected to the outlet chamber via a pilot control valve;
 (h) the pilot control valve includes a moving pilot control valve element and a pilot control valve body which is connected to an armature of an electromagnetic control solenoid;
a controlled valve wherein
 (i) the main valve element and the moving pilot control valve element are interconnected in such a way that a movement of the main valve element in opening direction of the main valve is a simultaneous movement of the moving pilot control valve element in closing direction of the pilot control valve;
 (j) the electromagnetic control solenoid has a continuous current versus stroke characteristic;
 (k) the pilot control chamber is connected to the operating chamber via a throttle passageway; and
 (l) the throttle passageway is dimensioned in such a way that when the cross-sectional opening of the pilot control valve is small it permits a flow rate to the pilot control chamber at at least the same flow rate that occurs from the pilot control chamber through the pilot control valve, and when cross-sectional opening of the pilot control valve is increased it permits a lower flow rate into the pilot control chamber than that occurring from the pilot control chamber through the pilot control valve; wherein pressure in the outlet chamber is applied to the actuator on a third surface facing the outlet chamber, wherein:

(1) the third surface is attached to the actuator in such a way that the pressure acting upon it biases the actuator toward the closing direction of the main valve;

(2) an equalizing chamber is connected to the outlet chamber; and (3) a fourth surface on the actuator facing the equalizing chamber on which pressure from the equalizing chamber is applied to bias the actuator in opening 13. The electromagnetically actuated valve device, according to claim 12, wherein the electromagnetic control solenoid has a rising stroke for growing current for causing a pulling motion.

14. The electromagnetically actuated valve device, according to claim 12, wherein the electromagnetic control solenoid has a declining stroke for growing current for causing a pushing motion.

15. The electromagnetically actuated valve device, according to claim 12, wherein the connection between the outlet chamber and the equalizing chamber is constructed as throttle passageway.

16. The electromagnetically actuated valve device, according to claim 12, wherein:

(a) the actuator is constructed as a piston consisting of two piston portions placed in series and rigidly connected by means of a body portion; and (b) the first surface is located on the one piston portion, the second surface is located on the other piston portion, and the first surface and the second surface face one another.

17. The electromagnetically actuated valve device, according to claim 16, wherein the third surface is located on the one piston, and the fourth surface is located on the other piston portion.

18. The electromagnetically actuated valve device, according to claim 17, wherein a valve seat is surrounded by the third surface, said value seat serving as said pilot control valve element.

19. The electromagnetically actuated valve device, according to claim 16, wherein:

(a) the one piston portion has a valve seat including the first surface which serves as a main valve element and simultaneously as a pilot control valve element; and (b) the body portion and the one piston portion are connected by a passageway to the pilot control chamber, and which forms a pilot control valve.

* * * * *